United States Patent
Brainos et al.

(10) Patent No.: US 7,599,371 B1
(45) Date of Patent: Oct. 6, 2009

(54) SYSTEM AND METHOD FOR OPTIMIZING DATA TRANSPORT IN A COMMUNICATIONS SYSTEM

(75) Inventors: Alain Brainos, Raleigh, NC (US); Mohammad Amir Ahmed-Khan, Raleigh, NC (US); Malcolm M. Smith, Calgary NW (CA); Walter L. Robinson, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 970 days.

(21) Appl. No.: 10/865,293

(22) Filed: Jun. 9, 2004

(51) Int. Cl.
*H04J 3/18* (2006.01)
(52) U.S. Cl. .................. 370/392; 370/469; 370/477
(58) Field of Classification Search .......... 370/352–356, 370/389, 392, 229, 475, 477
See application file for complete search history.

(56) References Cited

U.S. PATENT DOCUMENTS

| | | | |
|---|---|---|---|
| 5,894,557 A | 4/1999 | Bade et al. | |
| 6,134,245 A * | 10/2000 | Scarmalis | 370/474 |
| 6,192,051 B1 | 2/2001 | Lipman et al. | |
| 6,363,065 B1 | 3/2002 | Thornton et al. | |
| 6,400,722 B1 | 6/2002 | Chuah et al. | |
| 6,424,631 B1 * | 7/2002 | Czaja et al. | 370/252 |
| 6,477,595 B1 | 11/2002 | Cohen et al. | |
| 6,512,754 B2 | 1/2003 | Feder et al. | |
| 6,512,773 B1 | 1/2003 | Scott | |
| 6,542,504 B1 * | 4/2003 | Mahler et al. | 370/392 |
| 6,609,008 B1 * | 8/2003 | Whang et al. | 455/522 |
| 6,721,333 B1 * | 4/2004 | Milton et al. | 370/469 |
| 6,954,460 B2 * | 10/2005 | DeMars | 370/392 |
| 7,453,907 B2 * | 11/2008 | Jonsson et al. | 370/477 |
| 2002/0044567 A1 | 4/2002 | Voit et al. | |
| 2005/0259690 A1 * | 11/2005 | Garudadri et al. | 370/477 |

* cited by examiner

*Primary Examiner*—Seema S Rao
*Assistant Examiner*—Mon Cheri S Davenport
(74) *Attorney, Agent, or Firm*—Baker Botts L.L.P.

(57) ABSTRACT

A first router receives an original IS-634 standard frame formatted message over an A-bis interface from a base transceiver station. The first router identifies header information bits in the message for compression. The first router suppresses selected ones of the identified header information bits and encapsulates the message into a packet. A second router receives the packet from the first router and extracts the message from the packet. The second router reconstructs the selected ones of the header information bits that were suppressed by the first router. The second router regenerates the original IS-634 standard frame formatted message and transports the message to a base station controller over the A-bis interface.

23 Claims, 3 Drawing Sheets

ELEMENT FORMAT:

| 7 | 6 | 5 | 4 | 3 | 2 | 1 | 0 | OCTET |
|---|---|---|---|---|---|---|---|---|
| MESSAGE TYPE II ||||||||| 1 |

| 7 | 6 | 5 | 4 | 3 | 2 | 1 | 0 | OCTET |
|---|---|---|---|---|---|---|---|---|
| (MSB) | CRC |||||||| 1 |
| | | | | | | | (LSB) | 2 |

FORWARD LAYER 3 DATA:

| 7 | 6 | 5 | 4 | 3 | 2 | 1 | 0 | OCTET |
|---|---|---|---|---|---|---|---|---|
| RESERVED | FRAME TYPE ||| SEQUENCE NUMBER |||| 1 |
| FORWARD TRAFFIC CHANNEL GAIN ||||||||| 2 |
| REVERSE TRAFFIC CHANNEL $E_w/N_T$ ||||||||| 3 |
| RATE SET INDICATOR |||| FORWARD TRAFFIC CHANNEL RATE |||| 4 |
| RESERVED |||| POWER CONTROL SUBCHANNEL COUNT |||| 5 |
| FORWARD TRAFFIC CHANNEL INFORMATION+LAYER 3 FILL ||||||||| VARIABLE |

ELEMENT FORMAT:

| 7 | 6 | 5 | 4 | 3 | 2 | 1 | 0 | OCTET |
|---|---|---|---|---|---|---|---|---|
| MESSAGE TYPE II | | | | | | | | 1 |

| 7 | 6 | 5 | 4 | 3 | 2 | 1 | 0 | OCTET |
|---|---|---|---|---|---|---|---|---|
| (MSB) | | | | | | | | 1 |
| CRC | | | | | | | | |
| | | | | | | | (LSB) | 2 |

FORWARD LAYER 3 DATA:

| 7 | 6 | 5 | 4 | 3 | 2 | 1 | 0 | OCTET |
|---|---|---|---|---|---|---|---|---|
| RESERVED | FRAME TYPE | | | SEQUENCE NUMBER | | | | 1 |
| FORWARD TRAFFIC CHANNEL GAIN | | | | | | | | 2 |
| REVERSE TRAFFIC CHANNEL $E_W/N_T$ | | | | | | | | 3 |
| RATE SET INDICATOR | | | FORWARD TRAFFIC CHANNEL RATE | | | | | 4 |
| RESERVED | | | POWER CONTROL SUBCHANNEL COUNT | | | | | 5 |
| FORWARD TRAFFIC CHANNEL INFORMATION + LAYER 3 FILL | | | | | | | | VARIABLE |

*FIG. 2A*

ELEMENT FORMAT:

| 7 | 6 | 5 | 4 | 3 | 2 | 1 | 0 | OCTET |
|---|---|---|---|---|---|---|---|---|
| MESSAGE TYPE II ||||||||  1 |

| 7 | 6 | 5 | 4 | 3 | 2 | 1 | 0 | OCTET |
|---|---|---|---|---|---|---|---|---|
| (MSB) | | | CRC | | | | | 1 |
| | | | | | | | (LSB) | 2 |

REVERSE LAYER 3 DATA:

| 7 | 6 | 5 | 4 | 3 | 2 | 1 | 0 | OCTET |
|---|---|---|---|---|---|---|---|---|
| RESERVED | FRAME TYPE ||| SEQUENCE NUMBER |||| 1 |
| REVERSE TRAFFIC CHANNEL QUALITY |||||||| 2 |
| PACKET ARRIVAL TIME ERROR |||||||| 3 |
| SCALING || RATE SET INDICATOR | REVERSE TRAFFIC CHANNEL RATE |||||  4 |
| RESERVED ||||||| EIB | 5 |
| REVERSE TRAFFIC CHANNEL INFORMATION + LAYER 3 FILL |||||||| VARIABLE |

*FIG. 2B*

SYSTEM AND METHOD FOR OPTIMIZING DATA TRANSPORT IN A COMMUNICATIONS SYSTEM

TECHNICAL FIELD OF THE INVENTION

The present invention relates in general to communications signal processing and more particularly to a system and method for optimizing data transport in a communications system.

BACKGROUND OF THE INVENTION

Code Division Multiple Access (CDMA) technology has made use of backhaul transports by optimizing the L3 transport encapsulation to a point where it is difficult to obtain any additional bandwidth optimization. Since operational expense reduction is a key component to securing a wireless market space, a technique is needed to further optimize the transport in order to provide a competitive edge. More voice call and data flow capacity per transport link is need to obtain the competitive edge in the market.

SUMMARY OF THE INVENTION

From the foregoing, it may be appreciated by those skilled in the art that a need has arisen for a technique to obtain additional bandwidth optimization in a communications system. In accordance with the present invention, a system and method for optimizing data transport in a communications system are provided that substantially eliminate or greatly reduce disadvantages and problems associated with conventional bandwidth optimizations schemes.

According to an embodiment of the present invention there is provided a system for optimizing data transport in a communications system that includes a first router that receives an original IS-634 standard frame formatted message over an A-bis interface from a base transceiver station. The first router identifies header information bits in the message for compression and suppresses selected ones of the identified header information bits. The message is encapsulated into a packet for transport to a second router. The second router receives the packet from the first router and extracts the message from the packet. The second router reconstructs the selected ones of the header information bits that were suppressed by the first router. The second router regenerates the original IS-634 standard frame formatted message and transports the message to a base station controller over the A-bis interface.

The present invention provides various technical advantages over conventional bandwidth optimization schemes. Some of these technical advantages are shown and described in the description of the present invention. Embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIGS. 2A-2B illustrate example message structures transported within the communications system;

DETAILED DESCRIPTION OF THE INVENTION

Figure 1:
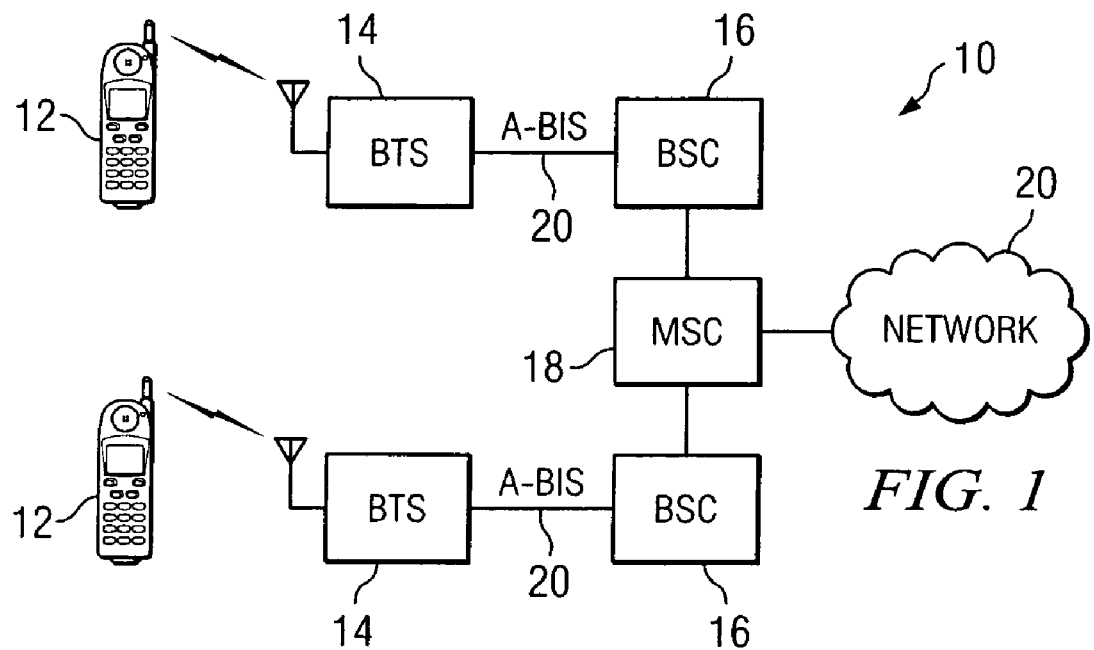
FIG. 1 illustrates a block diagram of a communications system.

FIG. 1 shows a simplified block diagram of a communications system 10. Communications system 10 includes one or more mobile or fixed users 12 that are capable of wireless communications. Users 12 receive traffic from and provide traffic to one or more base transceiver stations 14. Base transceiver stations 14 provide traffic to and receive traffic from one or more base station controllers 16. Base station controllers 16 in turn communicate with a mobile station controller 18 to facilitate a communication session initiated by or for users 12.

Between base transceiver station 14 and base station controller 16 is a communication link 20 that provides an A-bis interface for communications system 10. To optimize bandwidth on the A-bis interface, certain information bits in the traffic stream may be compressed and/or eliminated prior to transport between base transceiver station 14 and base station controller 16. The goal of the present invention is to go beyond L3 transport encapsulation optimization on a CDMA transport and, by using the approaches discussed below, systematically compress as much of the L2 and L3 frame as possible. The optimization techniques of the present invention adapt to the type of frame received and applies as much compression as possible on the various header fields of the traffic stream without interfering with other payload compression techniques.

FIGS. 2A-2B show the structure of messages transported between base transceiver station 14 and base station controller 16 over the A-bis interface. FIG. 2A shows a forward message structure of traffic passed from base transceiver station 14 to base station controller 16. FIG. 2B shows a reverse message structure of traffic passed from base station controller 16 to base transceiver station 14. Both message structures include a message type field, a payload field, and a cyclic redundancy check (CRC) field.

The message type field defines the function and format for each message. The bearer messages are Type II messages. Other Type II messages include connect, connect acknowledge, remove, remove acknowledge, drop, and propagation delay measurement report. The message field can be compressed to zero bits for optimization purposes for Type II bearer messages and the direction of the message can be inferred. The values for Type II bearer messages are defined as 07H for forward messages and 08H for reverse messages and can be detected and then compressed. All other values of Type II messages are not compressed and are forwarded unchanged.

The payload field includes the header and traffic information carried by the message. In the forward message structure, the payload field includes the following sub-fields: first reserved, frame type, sequence number, forward traffic channel gain, reverse traffic channel, rate set indicator, forward traffic channel rate, second reserved, power control sub-channel count and forward traffic channel information plus layer 3 filler. In the reverse message structure, the payload field includes the following sub-fields: first reserved, frame type, sequence number, reverse traffic channel quality, scaling, packet arrival time error, rate set indicator, reverse traffic channel rate, second reserved, erasure indicator bit, and reverse traffic channel information plus layer 3 filler.

From the forward and reverse message structure, various bits can be compressed to none in order to optimize the amount of bandwidth space required to transport these messages. For example, the first reserved bit is always set to 0 and is thus not needed for transport purposes. The frame type field is used to indicate the version number associated with the present frame format. At present, the frame type field has only one valid value identifying either a standard IS-634 or proprietary frame format. Since this identification can be provisioned, the frame type field can be compressed to zero bits. The sequence number field is set to CDMA system time in frames. If there is one High level Data Link Control multiplexed compressed User Datagram Protocol (HDLCmux/cUDP) flow per bearer message, the sequence number field becomes redundant with the cUDP sequence and can be thus compressed to zero bits. The sequence number is copied to the cUDP sequence. The decompressor takes the sequence as is since it is possible that base transceiver station 14 and base station controller 16 send frames out of sequence.

The forward and reverse traffic channel gain fields can be reduced from one byte to four bits. Though these fields can take on any value, differential updates can be sent in order to perform the bit reduction. The second reserved fields may be compressed away since there is no established function for them at this time. The power control sub-channel count field can also be removed and added when needed as it represents the number of soft handoff legs associated with the bearer message, which does not change often during a call. A differential technique may be implemented to send these four bits when there is a change in its value.

The rate set indicator fields corresponds to a rate set of the traffic channel frame. The rate set indicator field has two possible values (rate set 1 and rate set 2). For a given bearer message flow, only one value can exist so the rate set for the HDLCmux/cUDP flow can be negotiated. As a result, this field can be compressed from its four bit allocation to zero bits.

Tables I and II show the reverse and forward traffic channel rate field values. As shown, one of four rates can be used for each frame. In the HDLCmux scheme, each data rate is treated as a separate cUDP flow and the four bit field is removed and folded into the cUDP CID space. The original sequence numbers are maintained as it cannot be assumed that each of these flows will increase by one monotonically.

TABLE I

| Field Value | Rate Set 1 Transmission Rate | Rate Set 2 Transmission Rate |
| --- | --- | --- |
| 0000 | 9600 bps (Full Rate) | 14400 bps (Full Rate) |
| 0001 | 4800 bps (Half Rate) | 7200 bps (Half Rate) |
| 0010 | 2400 bps (Quarter Rate) | 3600 bps (Quarter Rate) |
| 0011 | 1200 bps (Eighth Rate) | 1800 bps (Eighth Rate) |
| 0100 | Erasure | Erasure |
| 0101 | Idle | Idle |
| 0110 | Rate Set 1 Full Rate Likely | Reserved |

All other values are reserved

TABLE II

| Field Value | Rate Set 1 Transmission Rate | Rate Set 2 Transmission Rate |
| --- | --- | --- |
| 0000 | 9600 bps (Full Rate) | 14400 bps (Full Rate) |
| 0001 | 4800 bps (Half Rate) | 7200 bps (Half Rate) |
| 0010 | 2400 bps (Quarter Rate) | 3600 bps (Quarter Rate) |
| 0011 | 1200 bps (Eighth Rate) | 1800 bps (Eighth Rate) |

All other values are reserved.

The rate set indicator is a four bit field that can be suppressed at the compressor side since this value will most of the time not change in mid-flow. Its possible values are 0 and 1. If an update to the rate set indicator is needed, the compressor will send a delta that indicates to the decompressor an update is required. The compressor and decompressor context tables are then updated with the new value in order to further suppress these four bits until the call ends or the field is again updated. The forward traffic channel rate is a four bit field that can be completely suppressed at all times based on the size of the frame payload. The compressor merely strips out these four bits. The decompressor reads the frame's payload size and derives the forward traffic channel rate value to forward to the A-bis interface. These possible values are 0000, 0001, 0010, and 0011.

Figure 3:
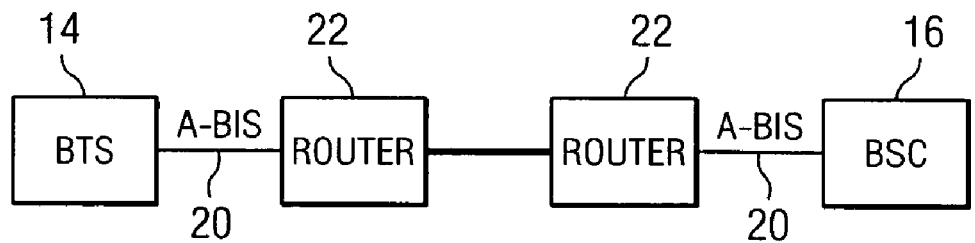
FIG. 3 illustrates a block diagram of a router implementation within the communications system.

FIG. 3 shows an implementation to perform further compression. A pair of routers 22, or other type of unit, provide a conversion capability on the A-bis interface between base transceiver station 14 and base station controller 16. Though shown as separate units, the functionality of routers 22 may be incorporated into base transceiver station 14 and/or base station controller 16. Routers 22, base transceiver station 14, and/or base station controller 16 may perform bit suppression through hardware, firmware, and/or software modules with executable code. Through this implementation, it is also possible to eliminate the CRC field of the bearer message. The CRC is a standard 16-bit value computed over the message Type II and forward/reverse payload fields. The CRC is based on a standard generated polynomial $g(x)=x^{16}+x^{12}+x^5+1$. By converting frames from the A-bis interface into an HDLC packetized protocol at the routers 22, there is no longer a need to retain this CRC field since the HDLC protocol also has a two byte layer 2 CRC that will protect against data corruption. The receiver router 22 from the A-bis interface removes the CRC field as part of the compression process. The sender router 22 to the A-bis interface will regenerate the CRC field for the 320-bit layer 2 frame. The HDLC PPP/IP format is as follows:

| L1 | L2 | L3 | | | L2 | L1 |
| --- | --- | --- | --- | --- | --- | --- |
| 0x7E | 0xFF00 0x0021 | L3 | IP | Packet | 0xCRCX | 0x7E . . . 0x7E . . . |
| 0x7E | 0xFF00 0x0067 | L3 | cUDP | Packet | 0xCRCX | 0x7E . . . 0x7E . . . |

The L2 0xFF00 0X0067 can be compressed to 0x67 by using ACFC and PFC. If 16-bit CIDs are used, it compresses to 0x2067.

Based on the various compression possibilities, overall about 5 bytes of layer 3 header can be compressed. In a best case scenario, all but one of these bytes can be compressed at any given time. In a worst case scenario, only two bytes of compression are achieved. As a result, anywhere from two to four bytes of header per frame can be eliminated from the transmission.

Assuming an IP/cUDP transport mechanism at routers 22, an un-compressed traffic transport is as follows:
[PID=1][cUDP=2][IS-634hdr=5][L2pld=11]=19 bytes
<- - - - -L3 payload- - - - - ->

Based on the above optimization, the traffic transport is reduced as follows:
Best Case Scenario (Yields an efficiency of 21%)
[PID=1][cUDP=2][IS-634hdr=1][L2pld=11]=19 bytes
<- - - - -L3 payload- - - - - ->
Worst case Scenario (Yields an efficiency of 11%)
[PID=1][cUDP=2][IS-634hdr=3][L2pld=11]=19 bytes
<- - - - -L3 payload- - - - - ->

The exact optimization percentage will vary slightly depending on the transport overhead. However, the compression method is independent of transport and is meant to be applied to the incoming IS-634 frames that are destined for a type of transport. Thus, by removing the CRC field and other selected header bits, additional bandwidth optimization can be achieved.

In summary, the IS-634 full frame transport optimization technique discussed above is designed to further optimize the CDMA A-bis interface between base transceiver station 14 and base station controller 16. The technique targets the L2 and L3 header information in three separate and distinct compression opportunities. The optimization technique takes transport optimization to a new level by not only compressing the L3 transport but also the A-bis L3 and L2 headers. Bandwidth is saved so that call and flow capacity is increased. Operational expenses are decreased through a reduction in the number of backhaul links needed for traffic transport.

Thus, it is apparent that there has been provided, in accordance with the present invention, a system and method for optimizing data transport in a communications system that satisfies the advantages set forth above. Although the present invention has been described in detail, it should be understood that various changes, substitutions, and alterations may be readily ascertainable by those skilled in the art and made herein without departing from the spirit and scope of the present invention as defined by the following claims. Moreover, the present invention is not intended to be limited in any way by any statement made herein that is not otherwise reflected in the following claims.

What is claimed is:

1. A method for optimizing data transport in a communications system: comprising:
   receiving an IS-634 standard frame formatted message carrying bearer traffic information;
   determining which of layer three and layer two headers of the message to compress;
   identifying header information bits in the determined layer three and layer two headers for compression;
   suppressing selected ones of the identified header information bits from the message;
   encapsulating the message into a packet for transport wherein the selected ones of the identified header information bits to be suppressed include bits representing a rate set indicator and a traffic channel rate for the message.

2. The method of claim 1, wherein the selected ones of the identified header information bits to be suppressed include bits representing a cyclic redundancy check for the message.

3. The method of claim 1, wherein the selected ones of the identified header information bits to be suppressed include bits representing a message type for the message.

4. The method of claim 1, wherein the selected ones of the identified header information bits to be suppressed include bits representing a frame type for the message.

5. The method of claim 1, wherein the selected ones of the identified header information bits to be suppressed include bits representing a traffic channel gain for the message.

6. The method of claim 1, further comprising:
   receiving the packet;
   extracting the message from the packet;
   reconstructing the selected ones of the identified header information bits that were suppressed;
   inserting the reconstructed header information bits into the message.

7. The method of claim 1, wherein the packet is in a user datagram protocol format.

8. A system for optimizing data transport in a communications system, comprising:
   a base transceiver station operable to transmit an original IS-634 standard frame formatted message onto an A-bis interface communication link to a base station controller;
   a first router operable to receive the message from the A-bis interface communication link, the router operable to determine which of layer three and layer two headers of the message to compress, the router operable to identify header information bits in the determined layer three and layer two headers for suppression, the router operable to suppress selected ones of the identified header information bits, the router operable to encapsulate the message into a packet for transport wherein the identified header information bits selected for suppression include bits representing a rate set indicator and a traffic channel rate for the message.

9. The system of claim 8, further comprising:
   a second router operable to receive the packet from the first router, the second router operable to extract the message from the packet, the second router operable to reconstruct the selected ones of the identified header information bits that were suppressed by the first router, the second router operable to generate the original IS-634 standard frame formatted message in response to the reconstructed header information bits.

10. The system of claim 9, further comprising:
    a base station controller operable to receive the original IS-634 standard frame formatted message for processing.

11. The system of claim 8, wherein the identified header information bits selected for suppression include bits representing a cyclic redundancy check for the message.

12. The system of claim 8, wherein the identified header information bits selected for suppression include bits representing a message type, a frame type, and a traffic channel gain for the message.

13. The system of claim 8, wherein the packet is in a user datagram protocol format.

14. A system for optimizing data transport in a communications system: comprising:
    means for receiving an original IS-634 standard frame formatted message carrying bearer traffic information;
    means for determining which of layer three and layer two headers of the message to compress;
    means for identifying header information bits in the determined layer three and layer two headers for compression;

means for suppressing selected ones of the identified header information bits from the message;

means for encapsulating the message into a packet for transport wherein the selected ones of the identified header information bits to be suppressed include bits representing a rate set indicator and a traffic channel rate for the message.

15. The system of claim 14, wherein the selected ones of the identified header information bits to be suppressed include bits representing a cyclic redundancy check for the message.

16. The system of claim 14, wherein the selected ones of the identified header information bits to be suppressed include bits representing a message type, a frame type, and a traffic channel gain for the message.

17. The system of claim 14, further comprising:
means for receiving the packet;
means for extracting the message from the packet;
means for reconstructing the selected ones of the identified header information bits that were suppressed;
means for generating the original IS-634 standard frame formatted message in response to the reconstructed header information bits.

18. The system of claim 14, wherein the packet is in a user datagram protocol format.

19. A computer readable medium including code for optimizing data transport in a communications system, the code operable to:
receive an original IS-634 standard frame formatted message carrying bearer traffic information;
determine which of layer three and layer two headers of the message to compress;
identify header information bits in the determined layer three and layer two headers for compression;
suppress selected ones of the identified header information bits from the message;
encapsulate the message into a packet for transport wherein the selected ones of the identified header information bits to be suppressed include bits representing a rate set indicator and a traffic channel rate for the message.

20. The computer readable medium of claim 19, wherein the selected ones of the identified header information bits to be suppressed include bits representing a cyclic redundancy check for the message.

21. The computer readable medium of claim 19, wherein the selected ones of the identified header information bits to be suppressed include bits representing a message type, a frame type, and a traffic channel gain for the message.

22. The computer readable medium of claim 19, wherein the code is further operable to:
receive the packet;
extract the message from the packet;
reconstruct the selected ones of the identified header information bits that were suppressed;
generate the original IS-634 standard frame formatted message in response to the reconstructed header information bits.

23. The computer readable medium of claim 19, wherein the packet is in a user datagram protocol format.

* * * * *

UNITED STATES PATENT AND TRADEMARK OFFICE
CERTIFICATE OF CORRECTION

PATENT NO.       : 7,599,371 B1                                              Page 1 of 1
APPLICATION NO.  : 10/865293
DATED            : October 6, 2009
INVENTOR(S)      : Brainos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1502 days.

Signed and Sealed this

Fourteenth Day of December, 2010

David J. Kappos
*Director of the United States Patent and Trademark Office*